US012636767B2

(12) United States Patent
Zheng et al.

(10) Patent No.: US 12,636,767 B2
(45) Date of Patent: May 26, 2026

(54) IMPACT TOOL

(71) Applicant: Nanjing Chervon Industry Co., Ltd., Nanjing (CN)

(72) Inventors: Yuyi Zheng, Nanjing (CN); Shaobo Liu, Nanjing (CN); Shubin Tong, Nanjing (CN); Di Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/172,197

(22) Filed: Apr. 7, 2025

(65) Prior Publication Data

US 2025/0229403 A1 Jul. 17, 2025

Related U.S. Application Data

(63) Continuation of application No. PCT/CN2023/124691, filed on Oct. 16, 2023.

(30) Foreign Application Priority Data

Oct. 20, 2022 (CN) ......................... 202211285800.3

(51) Int. Cl.
*B25F 5/00* (2006.01)
*B25B 21/02* (2006.01)

(52) U.S. Cl.
CPC .............. *B25F 5/001* (2013.01); *B25B 21/02* (2013.01)

(58) Field of Classification Search
CPC ................................. B25F 5/001; B25B 21/02
See application file for complete search history.

(56) References Cited

U.S. PATENT DOCUMENTS

| | | | | |
|---|---|---|---|---|
| 2013/0033217 | A1* | 2/2013 | Hirabayashi ......... | B25D 16/006 318/546 |
| 2015/0375388 | A1* | 12/2015 | Ullrich ...................... | B25F 5/02 173/170 |
| 2021/0170564 | A1 | 6/2021 | Gehret | |

FOREIGN PATENT DOCUMENTS

| | | | |
|---|---|---|---|
| CN | 101342693 | A | 8/2011 |
| CN | 102431013 | A | 8/2014 |
| CN | 104070490 | B | 11/2016 |
| CN | 105215915 | A | 4/2017 |
| CN | 110614393 | A | 5/2021 |
| CN | 113858134 | A | 12/2021 |
| CN | 113858135 | A | 12/2021 |

(Continued)

OTHER PUBLICATIONS

International Search and Written Opinion of application No. PCT/CN23/124691, dated Feb. 1, 2024, 15 pp.

*Primary Examiner* — Michelle Lopez
(74) *Attorney, Agent, or Firm* — Greenberg Traurig, LLP

(57) ABSTRACT

An impact tool includes a motor shaft; an output shaft used for outputting power and rotating about an output axis; an impact mechanism for providing an impact force; and a transmission mechanism for transmitting power between the motor shaft and the impact mechanism. The transmission mechanism includes a multi-stage transmission assembly, at least one stage of transmission assembly in the multi-stage transmission assembly has an adjustable transmission ratio, and an output transmission ratio of the multi-stage transmission assembly is greater than 1. A rotational speed and torque of the tool are adjusted mechanically so that output power of an electric motor is unchanged, and motor efficiency is improved to a certain extent.

19 Claims, 9 Drawing Sheets

(56) References Cited

FOREIGN PATENT DOCUMENTS

| | | | | | |
|---|---|---|---|---|---|
| DE | 202016001685 | U1 | | 6/2016 | |
| DE | 102015209406 | A1 | * | 11/2016 | ........... B25B 21/026 |
| JP | 3129974 | B2 | | 1/2001 | |

* cited by examiner

IMPACT TOOL

RELATED APPLICATION INFORMATION

This application is a continuation of International Application Number PCT/CN2023/124691, filed on Oct. 16, 2023, through which this application also claims the benefit under 35 U.S.C. § 119(a) of Chinese Patent Application No. CN 202211285800.3, filed on Oct. 20, 2022, which applications are incorporated herein by reference in their entireties.

TECHNICAL FIELD

The present application relates to a power tool, for example, an impact tool.

BACKGROUND

An impact tool can output rotary motions at a certain impact frequency and includes, but is not limited to, an impact wrench and an impact screwdriver. For example, the impact wrench is used for screwing bolts and nuts, and the impact screwdriver is often used for loosening or tightening screws. To achieve the rotary motions with a certain impact frequency, the impact tool needs to include an output member for outputting a rotary force and an impact mechanism for periodically impacting an output assembly.

The impact mechanism includes an impact block, a hammer anvil mating with the impact block, and a main shaft connected to an electric motor. When a condition for starting the impact mechanism is satisfied, the impact block reciprocates in an axial or radial direction and is periodically engaged with the hammer anvil to output an impact force in a direction of rotation.

In the related art, the impact tool generally adjusts an input current of the electric motor electronically to change the rotational speed of the electric motor, so as to adjust the speed of the output member and the impact torque. In one aspect, this puts very high requirements on the performance of electrical components. In the other aspect, to match electronic control with the performance of the electric motor, the impact tool is applicable to limited working conditions.

This part provides background information related to the present application, and the background information is not necessarily the related art.

SUMMARY

An example of the present application provides an impact tool that includes an impact mechanism for applying an impact force to an output shaft and a transmission mechanism including a multi-stage transmission assembly, where at least one stage of transmission assembly in the multi-stage transmission assembly has an adjustable transmission ratio.

In some examples, an output transmission ratio of the multi-stage transmission assembly is greater than 1.

In some examples, the impact tool further includes an electric motor including a motor shaft rotating about a first axis; and the output shaft used for outputting power and rotating about an output axis. The transmission mechanism is used for transmitting power between the motor shaft and the impact mechanism.

In some examples, the transmission mechanism has at least two transmission states for making the output shaft output different rotational speeds.

In some examples, the output transmission ratio of the transmission mechanism in any of the at least two transmission states is greater than 1.

In some examples, a switching mechanism is further included, which is used for driving the transmission mechanism to switch between different transmission states.

In some examples, the transmission mechanism includes a first-stage planetary gearset and a second-stage planetary gearset.

In some examples, the first-stage planetary gearset is closer to the motor shaft, and the second-stage planetary gearset is closer to the impact mechanism.

In some examples, the second-stage planetary gearset has two transmission ratios.

In some examples, at least one of the two transmission ratios of the second-stage planetary gearset is greater than 1.

In some examples, the second-stage planetary gearset includes a second inner ring gear.

In some examples, the second inner ring gear is configured to move between a first position and a second position.

In some examples, when the second inner ring gear is at the first position, the second inner ring gear is prevented from rotating.

In some examples, the transmission mechanism further includes a locking ring for limiting the second inner ring gear.

In some examples, the locking ring is connected to a first bearing for supporting a main shaft.

In some examples, the impact mechanism includes a main shaft driven by the motor shaft and a first bearing for supporting the main shaft. Along a direction of the first axis, the first bearing is closer to the output shaft than the multi-stage transmission assembly.

In some examples, the impact mechanism includes an impact block driven by the main shaft and a hammer anvil that mates with the impact block and is struck by the impact block.

In some examples, the hammer anvil drives the output shaft to rotate, and the impact block rotates integrally with the main shaft through balls and is capable of reciprocating a specified stroke relative to the main shaft along the direction of the first axis to periodically mate with the hammer anvil.

In some examples, the impact mechanism further includes an elastic element that provides a force for the impact block to approach the hammer anvil, and the elastic element has at least two different spring constants.

In some examples, the elastic element is configured to be a coil spring with different pitches.

In some examples, a power supply is further included, where the power supply provides a nominal voltage of at least 4 V and supplies electrical energy to the electric motor.

An example of the present application provides an impact tool that includes an impact mechanism used for applying an impact force to an output shaft and including a main shaft driven by a motor shaft; and a transmission mechanism for transmitting power between the motor shaft and the main shaft; where an output transmission ratio of the transmission mechanism is adjustable.

In some examples, the output shaft outputs different rotational speeds.

In some examples, the output transmission ratio of the transmission mechanism is greater than 1.

In some examples, the impact tool further includes an electric motor including the motor shaft rotating about a first axis; and the output shaft used for outputting power and rotating about an output axis.

An example of the present application provides an impact tool that includes an impact mechanism used for applying an impact force to an output shaft and including a main shaft driven by a motor shaft. Along a direction of a first axis, a first bearing for supporting the main shaft is closer to the output shaft than a multi-stage transmission assembly.

In some examples, the impact tool further includes a transmission mechanism for transmitting power between the motor shaft and the main shaft. The transmission mechanism includes the multi-stage transmission assembly, and the multi-stage transmission assembly includes at least two stages of reduction drives.

In some examples, the impact tool further includes an electric motor including the motor shaft rotating about a first axis; and the output shaft used for outputting power and rotating about an output axis.

In some examples, an output transmission ratio of the transmission mechanism is adjustable.

In some examples, the output transmission ratio of the multi-stage transmission assembly is greater than 1.

In some examples, a power supply is further included, where the power supply provides a nominal voltage of at least 4 V and supplies electrical energy to the electric motor.

DETAILED DESCRIPTION

Figure 1:
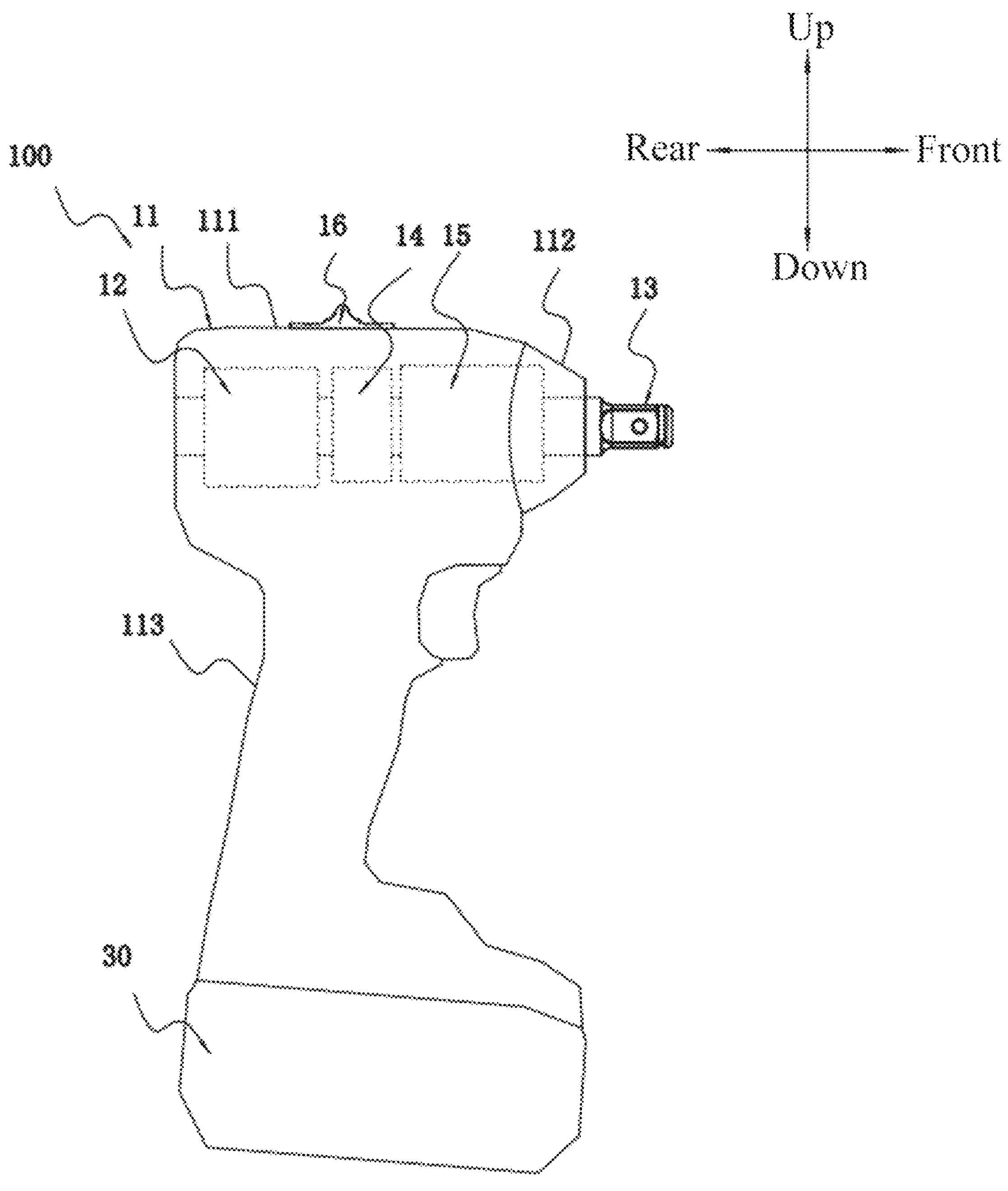
FIG. 1 is a structural view of a first example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected “above” or “under” the other element, but can also be indirectly connected “above” or “under” the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Figure 3:
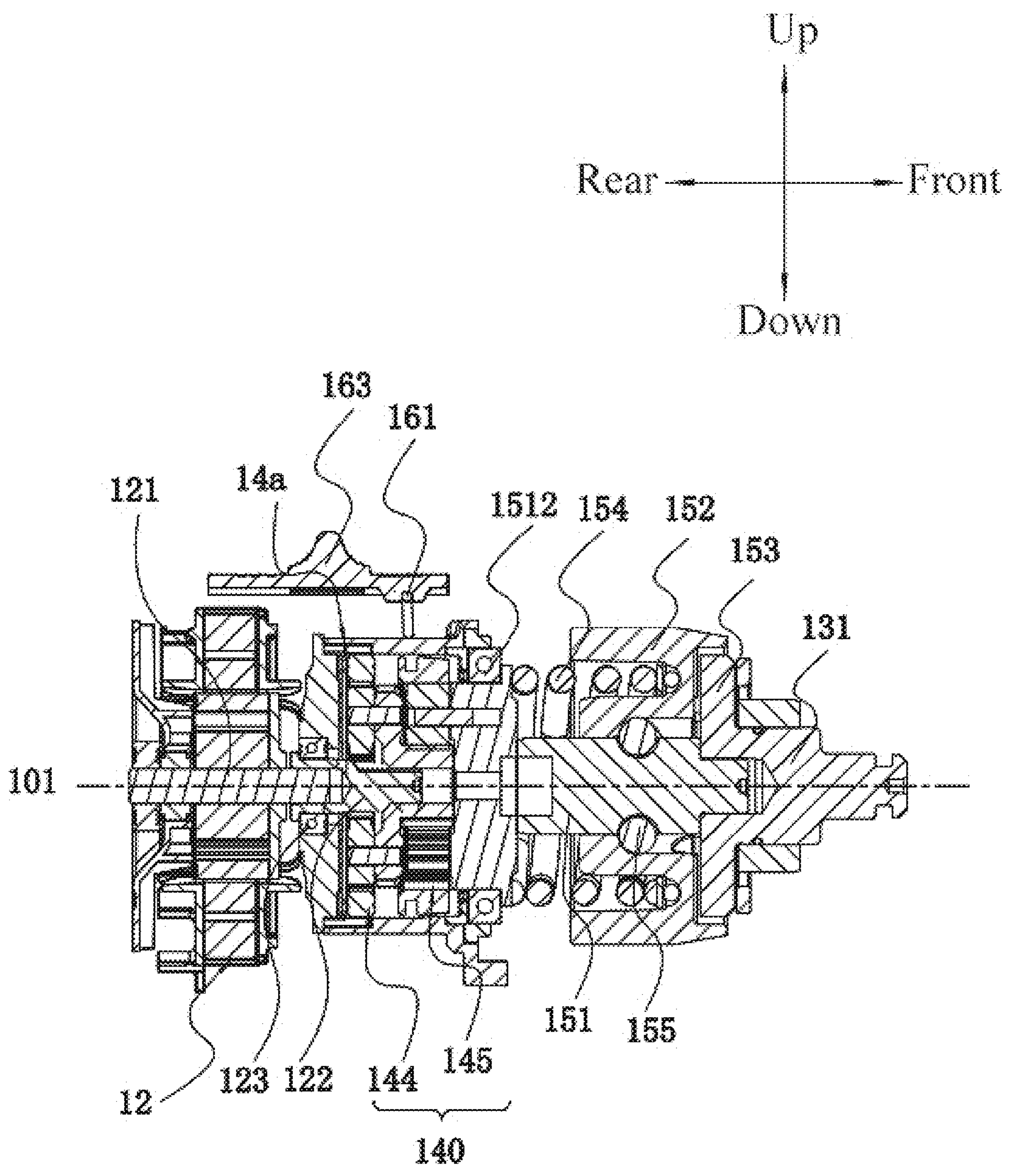
FIG. 3 is a sectional view of FIG. 2.

To describe the technical solutions of the present application clearly, an upper side, a lower side, a left side, a right side, a front side, and a rear side are defined, as shown in FIGS. 1 and 3.

FIG. 1 shows an impact tool in a first example of the present application. In this example, the impact tool is an impact wrench 100. It is to be understood that the impact tool is a rotary tool. In other alternative examples, different working accessories may be mounted to the rotary tool so that with these different working accessories, the impact tool may be, for example, an impact screwdriver or an impact drill.

FIG. 1 shows that the impact wrench 100 in the first example of the present application includes a power supply 30. The power supply 30 is used for supplying electrical energy to the impact wrench 100. In this example, the power supply 30 is a battery pack, and the battery pack powers corresponding components in the impact wrench 100 in collaboration with a corresponding power supply circuit. It is to be understood by those skilled in the art that the power supply 30 is not limited to the battery pack, and the corresponding components in the machine may be powered by mains electricity or an alternating current power supply in collaboration with corresponding rectifier, filter, and voltage regulator circuits.

The impact wrench 100 includes a housing 11, an electric motor 12, an output mechanism 13, a transmission mechanism 14, and an impact mechanism 15. The housing 11 includes a motor housing 111 for accommodating the electric motor 12 and an output housing 112 for accommodating at least part of the output mechanism 13. The output housing 112 is connected to the front end of the motor housing 111. The housing 11 is further formed with or connected to a grip 113 for a user to operate. The grip 113 and the motor housing 111 form a T-shaped or L-shaped structure, facilitating the grip and operation of the user. The power supply 30 is connected to an end of the grip 113. The power supply 30 is detachably connected to the grip 113.

As shown in FIGS. 1 to 4, the electric motor 12 includes a motor shaft 121 rotating about a first axis 101.

The output mechanism 13 includes an output shaft 131 for connecting a working accessory and driving the working accessory to rotate. A clamping assembly is disposed at the front end of the output shaft 131 and can clamp corresponding work accessories such as a screwdriver, a drill bit, and a socket to implement different functions.

The output shaft 131 is used for outputting power. The output shaft 131 rotates about an output axis. In this example, the output axis is a second axis 102. In this example, the first axis 101 coincides with the second axis 102. In other alternative examples, a certain angle exists between the second axis 102 and the first axis 101. In other alternative examples, the first axis 101 and the second axis 102 are parallel to each other but do not coincide with each other.

Figure 4:
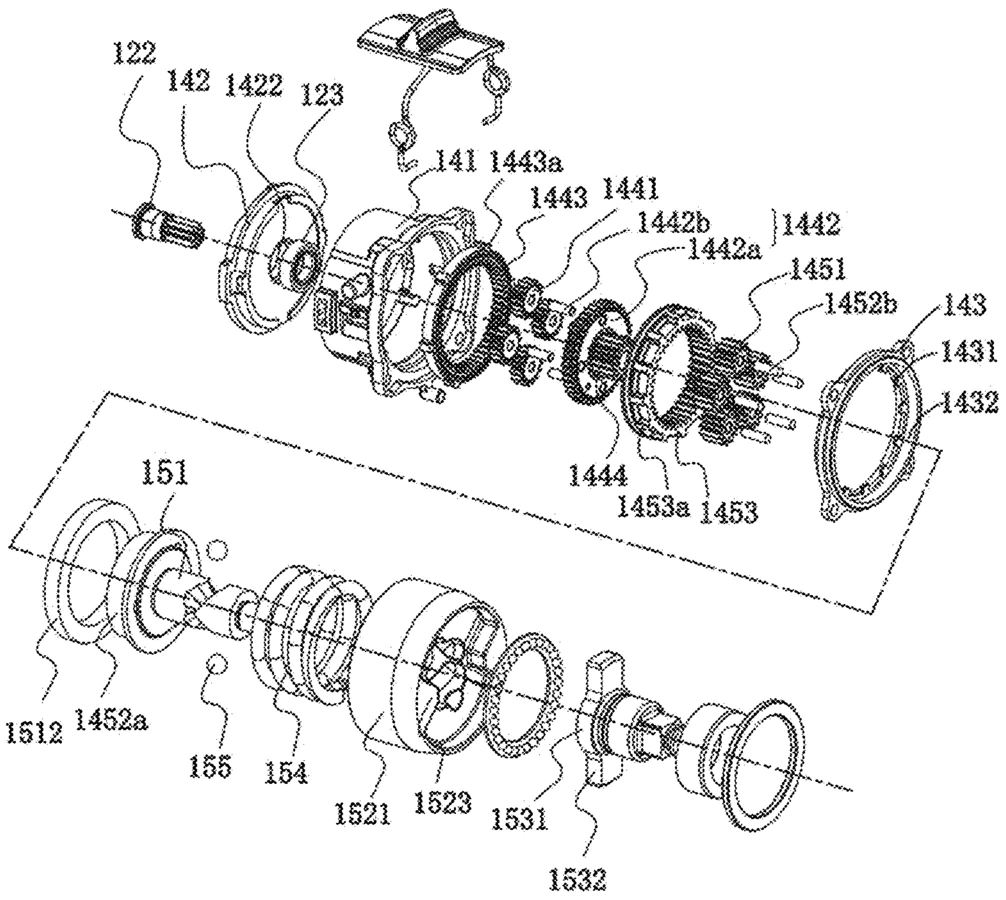
FIG. 4 is an exploded view of the structure of FIG. 2.
Figure 5:
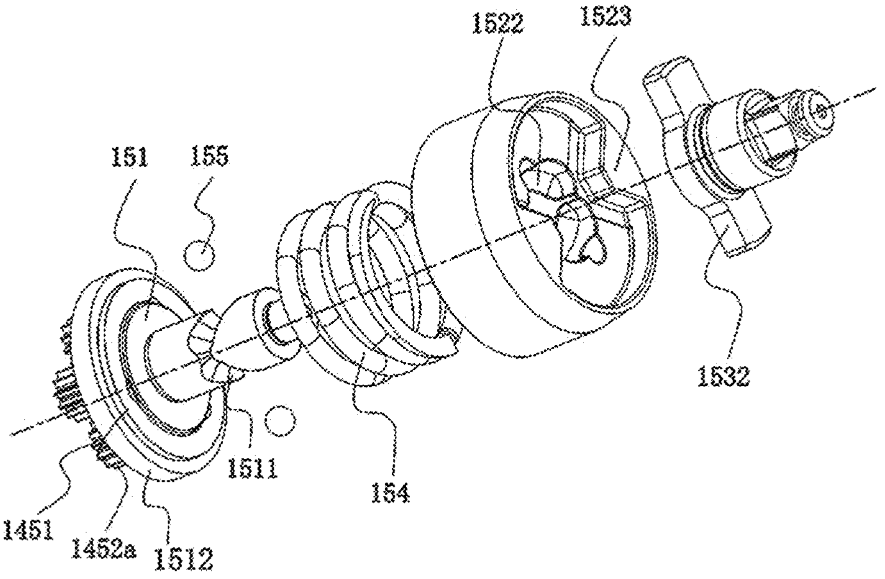
FIG. 5 shows an impact mechanism in FIG. 4 from another angle.

As shown in FIGS. 3 to 5, the impact mechanism 15 is used for providing an impact force for the output shaft 131. The impact mechanism 15 includes a main shaft 151, an impact block 152 sleeved on the outer circumference of the main shaft 151, a hammer anvil 153 disposed at the front end of the impact block 152, and an elastic element 154. The hammer anvil 153 is connected to the output shaft 131. In this example, the hammer anvil 153 includes an anvil 1531, and the output shaft 131 is formed at or connected to the front end of the anvil 1531. It is to be understood that the anvil 1531 and the output shaft 131 may be integrally formed or separately formed as independent parts.

The impact block 152 is driven by the main shaft 151, and the anvil 1531 mates with the impact block 152 and is struck by the impact block 152. The impact block 152 includes an impact block body 1521 and a pair of first end teeth 1523 that are symmetrically provided and protrude radially on the front end face of the impact block body 1521. A pair of second end teeth 1532 are symmetrically provided and protrude radially on the rear end surface of the anvil 1531 opposite to the impact block 152. The output shaft 131 extends out of the output housing 112. The impact block 152 is supported on the main shaft 151 to rotate integrally with the main shaft 151 and can slide back and forth relative to the main shaft 151 in an axial direction of the main shaft. In this example, an axis of the main shaft coincides with an axis of the motor shaft. Therefore, the impact block 152 rotates and slides back and forth relative to the main shaft 151 along a direction of the first axis 101. In other alternative examples, the axis of the main shaft may be parallel to the axis of the motor shaft but does not coincide with the axis of the motor shaft. Alternatively, a certain angle exists between the axis of the main shaft and the axis of the motor shaft.

The elastic element 154 provides a force for the impact block 152 to approach the hammer anvil 153. In this example, the elastic element 154 is a coil spring.

Figure 6:
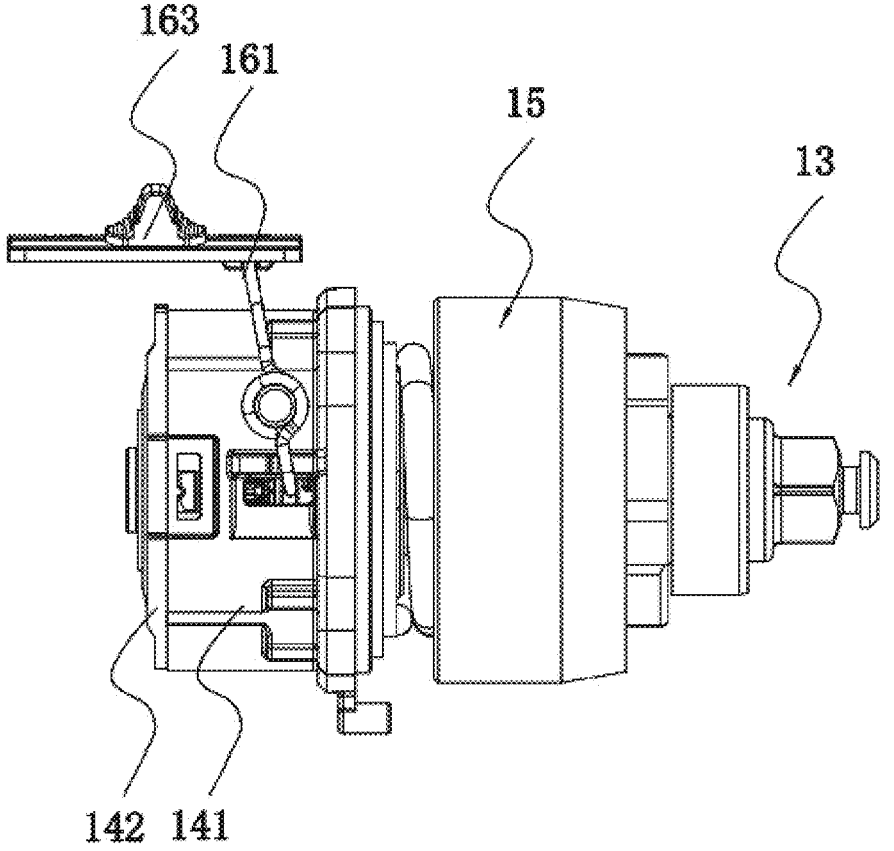
FIG. 6 is a structural view of the transmission mechanism, impact mechanism, output mechanism, and switching mechanism in FIG. 2, where an impact block is at a second position, and a second inner ring gear is at a first position.
Figure 7:
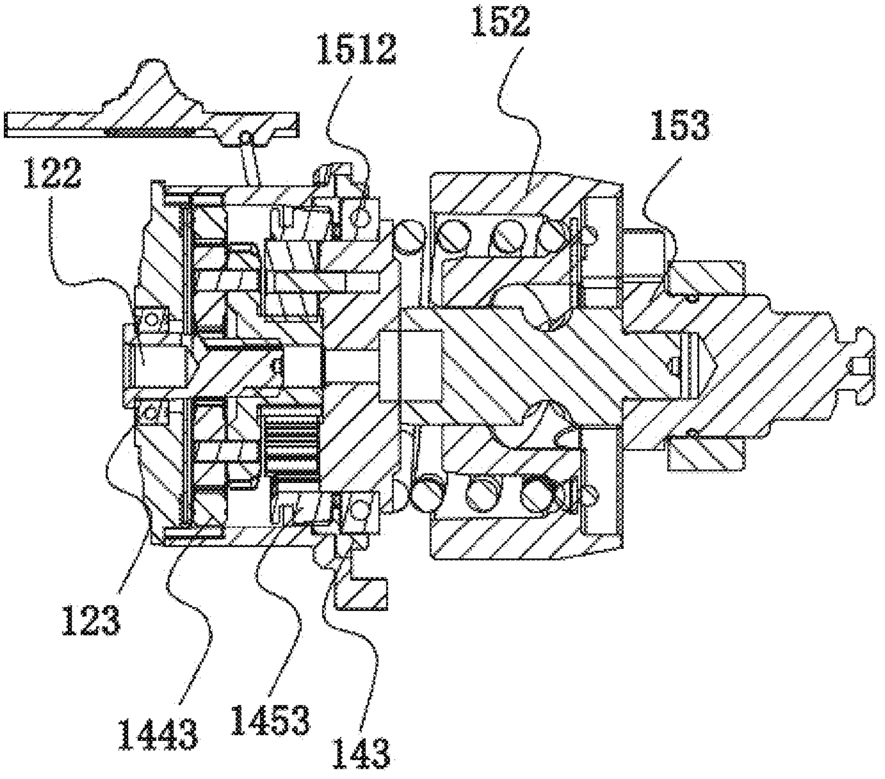
FIG. 7 is a sectional view of FIG. 6.
Figure 8:
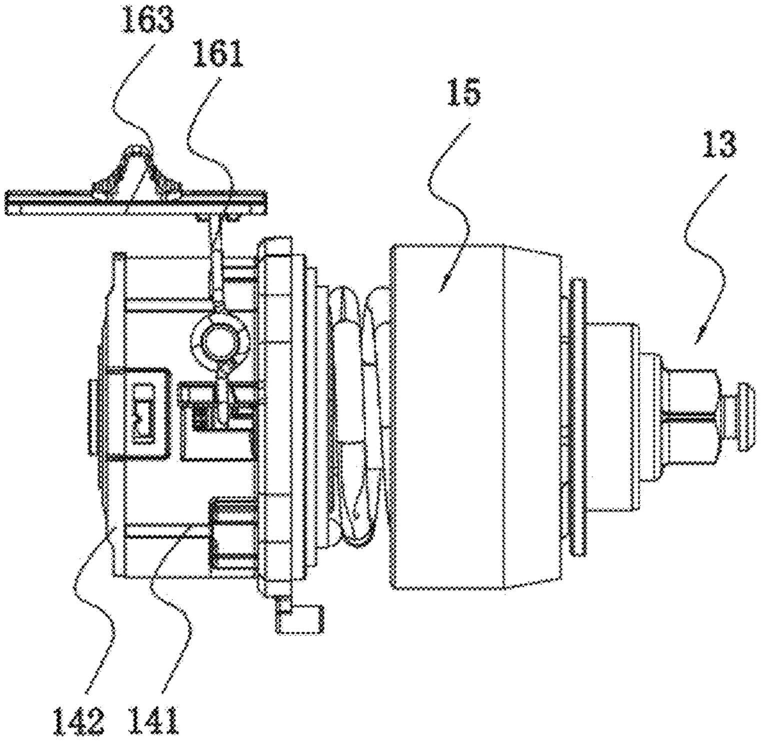
FIG. 8 is a structural view of the transmission mechanism, impact mechanism, output mechanism, and switching mechanism in FIG. 2, where an impact block is at a first position, and a second inner ring gear is at a second position.
Figure 9:
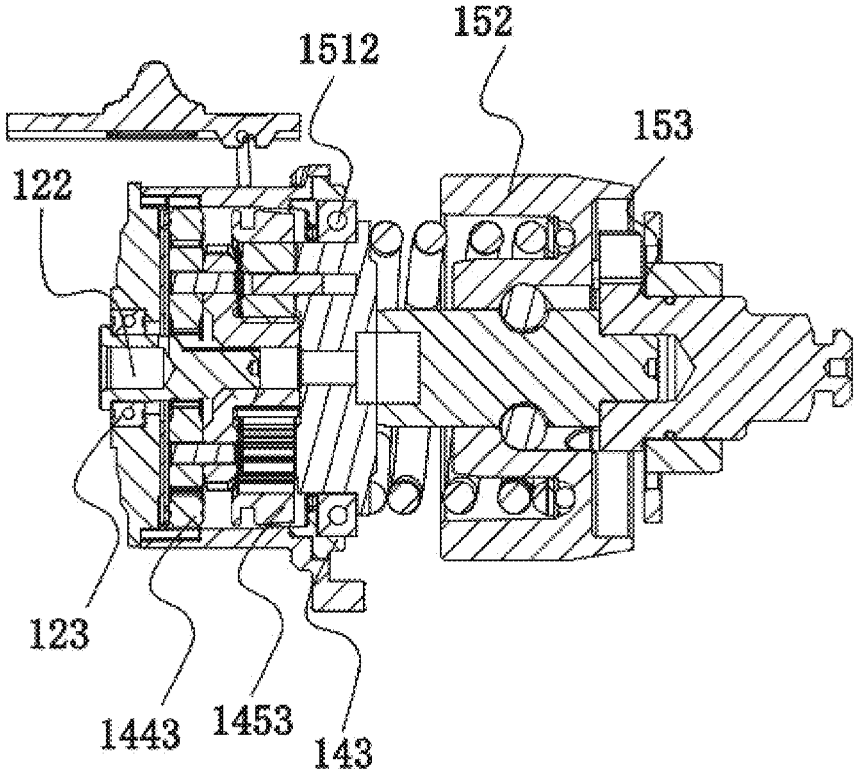
FIG. 9 is a sectional view of FIG. 8.

In a working process of the impact wrench 100, the impact block 152 reciprocates a specified stroke relative to the main shaft 151 along the direction of the first axis 101 while rotating integrally with the main shaft. As shown in FIGS. 6 to 9, the impact block 152 includes a first position to which the impact block 152 moves forward farthest and a second position to which the impact block 152 moves backward farthest. As shown in FIGS. 6 and 7, the impact block is at the second position. As shown in FIGS. 8 and 9, the impact block is at the first position. The first end teeth 1523 of the impact block 152 at the first position are engaged with the hammer anvil 153, that is to say, the front end of the stroke of the impact block 152 is stopped by the hammer anvil 153.

A pair of first ball grooves 1522 that open forward and extend backward along a front and rear direction are further provided on the front end face of the impact block body 1521. A pair of V-shaped second ball grooves 1511 are formed on the outer surface of the main shaft 151. Each first ball groove 1522 and each second ball groove 1511 have semicircular groove bottoms. The impact mechanism 15 further includes balls 155. Each ball 155 straddles the first ball groove 1522 and the second ball groove 1511 so that the impact block 152 and the main shaft 151 are connected to each other and move together. In this example, the ball 155 is a steel ball.

In the related art, since the impact block and the main shaft are separately provided with inwardly recessed V-shaped grooves to form ball channels together, the balls 155 are disposed between the impact block 152 and the main shaft 151 and embedded into the ball channels. Thus, the main shaft 151 can drive, through the balls 155, the impact block 152 to rotate, and the impact block 152 mates with the hammer anvil 153 to drive the hammer anvil 153 to rotate so as to further drive the output shaft 131 to rotate.

When the impact tool works with no load, the impact mechanism performs no impact and implements a transmission function to transmit the rotation of the electric motor to the output shaft. When a load is applied to the impact tool, the rotation of the output shaft is hindered. The output shaft may decrease in the rotational speed or may completely stop rotating due to different magnitudes of the load. When the output shaft completely stops rotating, the hammer anvil also stops rotating. Since the impact block is circumferentially limited by the hammer anvil, the impact block also stops rotating. However, the main shaft continues rotating. Thus, the balls are squeezed and move along the ball channels to drive the impact block to displace backward along the axis of the main shaft, that is, move towards the second position of the impact block. At the same time, the elastic element is compressed until the hammer anvil is completely disengaged from the impact block, and the impact block is at the second position. The main shaft drives the impact block to rotate at a certain rotational speed, and the elastic element springs back along the axial direction, that is, the impact block moves towards the first position. A relative rotational speed between the impact block and the hammer anvil is a rotational speed of the impact block. When rotating to be in contact with the hammer anvil, the impact block applies an impact force to the hammer anvil. At this time, the impact block is at the first position. Under the action of the impact force, the output shaft overcomes the load and continues rotating by a certain angle, and then the output shaft stops rotating again. The preceding process is repeated. Due to a sufficiently high impact frequency, relatively continual impact forces are applied to the output shaft so that the working accessory works continuously.

Figure 2:
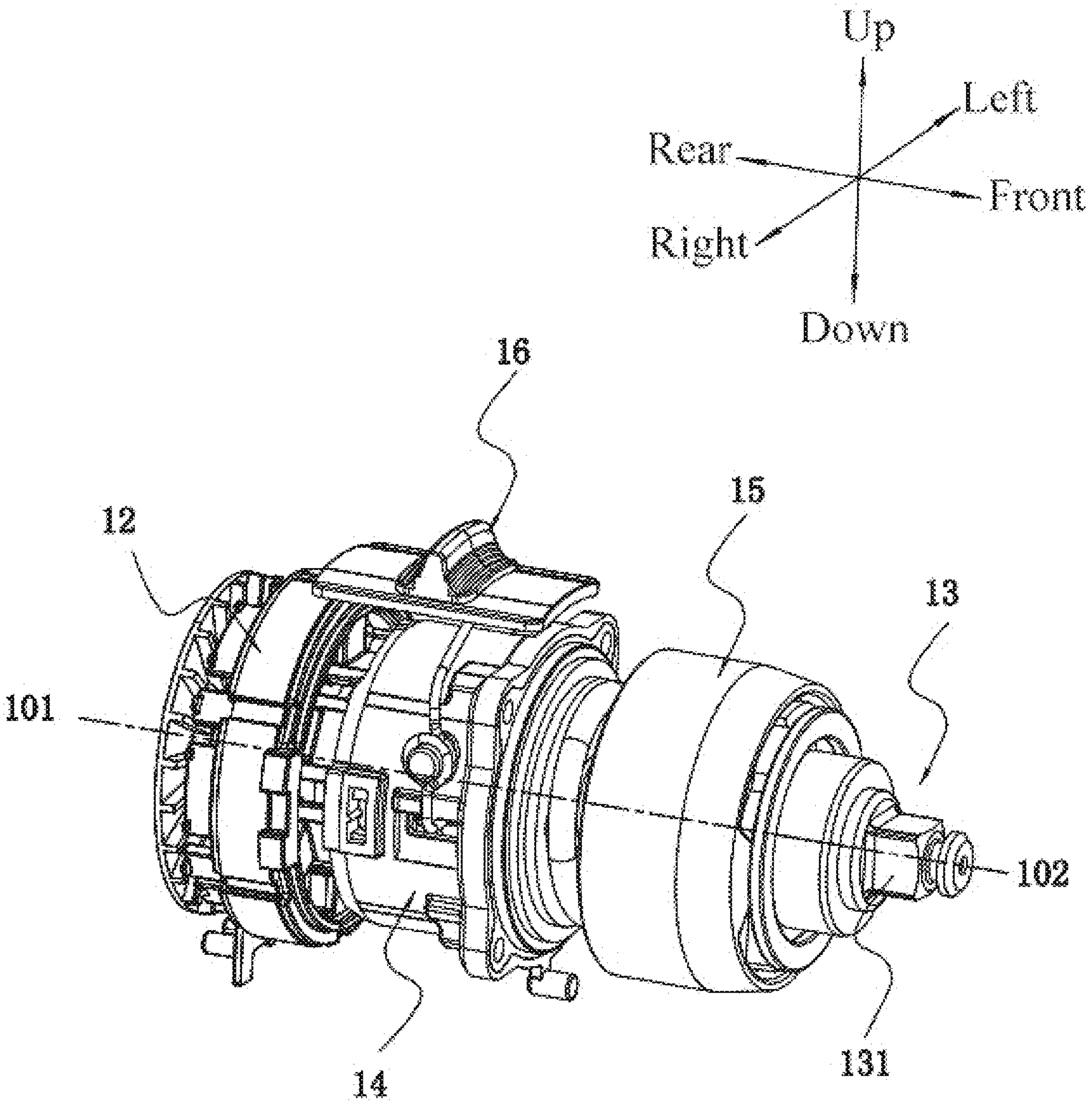
FIG. 2 is a structural view of an electric motor, transmission mechanism, impact mechanism, output mechanism, and switching mechanism in the first example of FIG. 1.

As shown in FIGS. 2 to 4, the transmission mechanism 14 is disposed between the electric motor 12 and the impact mechanism 15 and used for transmitting power between the motor shaft 121 and the main shaft 151.

The transmission mechanism 14 includes a multi-stage transmission assembly. In this example, the multi-stage transmission assembly is a multi-stage planetary transmission assembly 140. A planetary transmission assembly includes planet gears, a planet carrier for mounting the planet gears, and an inner ring gear meshing with the planet gears. At least one stage of planetary transmission assembly in the multi-stage planetary transmission assembly 140 is configured with an adjustable transmission ratio. In this example, an output transmission ratio of the multi-stage planetary transmission assembly 140 is greater than 1. A planet carrier in a planetary transmission assembly closer to the impact mechanism 15 in the multi-stage planetary transmission assembly 140 is formed on or connected to the main shaft 151. In this example, an inner ring gear in at least one stage of planetary transmission assembly is configured to move between a first position and a second position. Along the direction of the first axis 101, a first bearing 1512 for supporting the main shaft 151 is closer to the output shaft 131 than the multi-stage planetary transmission assembly 140. Compared with an existing electronic speed regulation manner for changing a rotational speed of the electric motor to achieve torque adjustment in the related art, the multi-stage planetary transmission assembly is disposed and a transmission ratio of a planetary gearset is adjusted so that the rotational speed is adjusted and the torque adjustment is implemented, which is equivalent to the addition of a mechanical manner for adjusting the rotational speed and torque. In product applications, the mechanical manner of the present application may be used alone, or the electronic speed regulation manner and the mechanical manner may be used simultaneously. The diverse adjustment manners provide more adjustment options. In this example, the transmission ratio of the planetary transmission assembly is adjustable, that is to say, the planetary transmission assembly has at least two different transmission ratios. One transmission ratio is greater than 1, to function as a drive for speed reduction and torque increase. Another transmission ratio is basically equal to 1, and the planetary gearset implements only the transmission function.

Moreover, when the rotational speed and torque are adjusted in the mechanical manner of the present application, output power of the electric motor is unchanged. Motor efficiency can be improved to a certain extent. That is to say, the electric motor outputs the rotational speed and torque within a high-efficiency interval, and the transmission ratio of the transmission mechanism is adjusted so that the rotational speed is adjusted. In the other aspect, when low-speed output is achieved in the electronic manner, a current is reduced so that the output rotational speed is reduced. A brushless direct current electric motor (BLDC) is controlled in a regulation manner of pulse-width modulation (PWM) signals. Limited by a duty cycle of the electric motor and the performance of controllable semiconductor power devices (such as metal-oxide-semiconductor field-effect transistors (MOSFETs)), a threshold of a minimum rotational speed output by the electric motor is also limited. However, the added mechanical manner for adjustment overcomes a threshold limitation of the electronic speed regulation, and the output rotational speed can be further reduced. The ratio of the output rotational speed of the electric motor to the output rotational speed of the output shaft becomes larger. When the output rotational speed of the output shaft is low, the electric motor is not prone to a startup failure or a locked rotor. Moreover, impact can be implemented when the output rotational speed of the output shaft is low, further extending a rotational speed interval of the impact tool. Under a working condition where a high speed is required, the transmission ratio is adjusted to be basically 1. In this transmission state, high-speed output is not affected.

The transmission mechanism with an adjustable transmission ratio is added so that a range of electric motors adapted to the impact tool is expanded to a certain extent. In the related art, an output torque threshold of the electric motor used in the impact tool is to be higher than that of an electric motor used in a tool that performs only rotary output. This is because torque transmitted to the main shaft needs to be capable of driving the impact block to overcome the pressure of the elastic element to start the impact. When the output power and output torque of the electric motor cannot satisfy this condition, the impact process cannot be initiated, and the electric motor has a locked rotor. In the present application, multi-stage reduction is performed for torque increase so that electric motors with low power can be applied to the impact tool, for example, a small screwdriver that uses a small electric motor with a 4 V voltage (built-in battery). Moreover, the adjustable function facilitates the use under different working conditions and facilitates product miniaturization and the development of portable impact tools.

In this example, the transmission mechanism 14 has two transmission states for making the output shaft 131 output different rotational speeds. As shown in FIG. 3, the transmission mechanism 14 includes a housing assembly 14*a*, a first-stage planetary gearset 144, and a second-stage planetary gearset 145. It is to be understood that in this example, to ensure the compactness in the overall length of the impact wrench as much as possible, two transmission states and two stages of planetary gearsets are provided. However, according to the actual product requirements, the transmission mechanism may be provided with more than two transmission states and more than two stages of planetary gearsets. The above does not affect the substance of the present application.

As shown in FIGS. 3 and 4, the first-stage planetary gearset 144 and the second-stage planetary gearset 145 are at least partially located in the housing assembly 14*a*. The first-stage planetary gearset 144 is closer to the motor shaft 121 than the second-stage planetary gearset 145, and the second-stage planetary gearset 145 is closer to the main shaft 151 than the first-stage planetary gearset 144. In this example, the first-stage planetary gearset 144 outputs only one transmission ratio. That is, the first-stage planetary gearset 144 outputs a first transmission ratio, where the first transmission ratio is greater than 1. That is to say, the first-stage planetary gearset 144 performs reduction for torque increase, an output rotational speed of the first-stage planetary gearset 144 is lower than an input rotational speed of the first-stage planetary gearset 144, and output torque of the first-stage planetary gearset 144 is greater than input torque of the first-stage planetary gearset 144.

Optionally, the first-stage planetary gearset 144 includes first planet gears 1441, a first planet carrier 1442 for mounting the first planet gears 1441, and a first inner ring gear 1443 meshing with the first planet gears 1441. The motor shaft 121 is formed with or connected to a first sun gear 122 rotating at a first rotational speed. In this example, the first sun gear 122 and the motor shaft 121 rotate coaxially. Optionally, the first sun gear 122 rotates about the first axis 101. In other alternative examples, the first sun gear 122 is connected to the motor shaft 121.

The first sun gear 122 drives the first planet gears 1441. The first planet gears 1441 are configured to mesh with the first sun gear 122. Multiple first planet gears 1441 are provided, and the multiple first planet gears 1441 are configured to mesh with the first sun gear 122. In this example, four first planet gears 1441 are circumferentially and evenly disposed around the first axis 101. The first sun gear 122 and the first planet gears 1441 are formed with a meshing tooth portion for transmitting power. Since the first transmission ratio is greater than 1, the tip diameter of the meshing tooth portion of the first sun gear 122 is configured to be smaller than the tip diameter of the first-stage planetary gearset 144 so that the number of meshing teeth of the first-stage planetary gearset 144 is greater than the number of teeth of the meshing tooth portion of the sun gear. The first inner ring gear 1443 meshes with the periphery of the multiple first planet gears 1441. The first planet carrier 1442 includes a first drive disk 1442*a*, a first support frame 1442*b*, and a first output portion. The first support frame 1442*b* and the first output portion are separately formed on two sides of the first drive disk 1442*a*. The first output portion rotates synchronously with the first drive disk 1442*a*. The first support frame 1442*b* is inserted into the first planet gears 1441 and rotatably connected to the first planet gears 1441 so that the first planet gears 1441 can drive the first planet carrier 1442 to rotate about the first axis 101. Meshing teeth are formed on the circumferential side of the first output portion, and the first output portion is configured to mesh with the second-stage planetary gearset 145 so that the first-stage planetary gearset 144 and the second-stage planetary gearset 145 are drivingly connected. In this example, the first output portion is a second sun gear 1444 in the second-stage planetary gearset 145.

The second-stage planetary gearset 145 includes second planet gears 1451, a second planet carrier 1452 for mounting the second planet gears 1451, and a second inner ring gear 1453 meshing with the second planet gears 1451. The second sun gear 1444 drives the second planet gears 1451. In this example, the second sun gear 1444 and the motor shaft 121 rotate coaxially. Optionally, the second sun gear 1444 rotates about the first axis 101. The second planet gears 1451 are configured to mesh with the second sun gear 1444. Multiple second planet gears 1451 are provided, and the multiple second planet gears 1451 are each configured to mesh with the second sun gear 1444. In this example, five second planet gears 1451 are circumferentially and evenly disposed around the first axis 101. A meshing relationship between the second planet gears 1451, the second planet carrier 1452, and the second inner ring gear 1453 is the same as the meshing relationship in the first-stage planetary gearset 144 and is well-known to those skilled in the art. The details are not repeated here.

Figure 11:
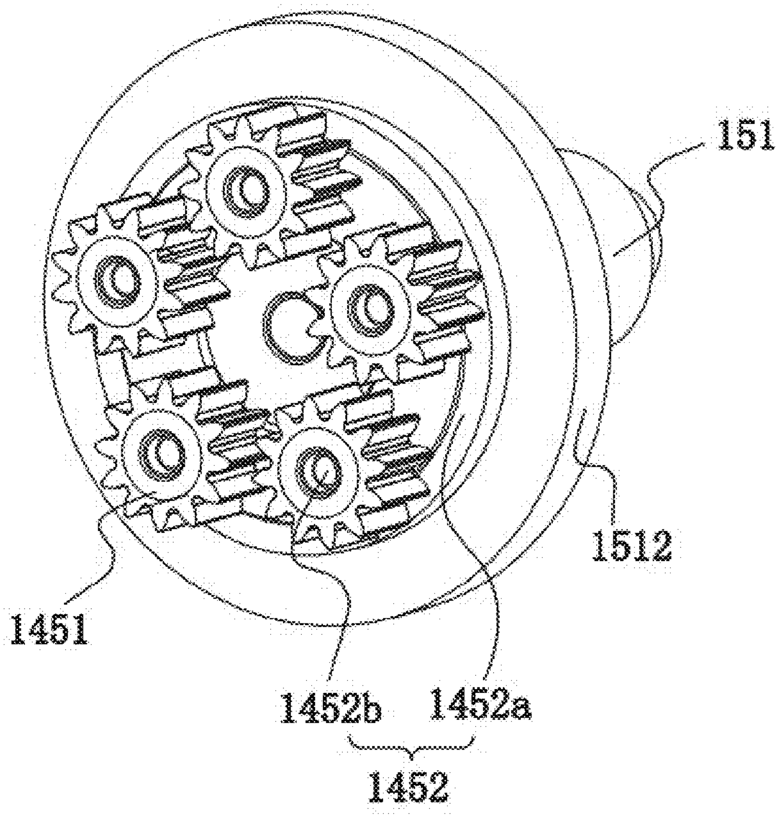
FIG. 11 is a view showing the assembly of a main shaft, second planet gears, and a second planet carrier.

The second planet carrier 1452 includes a second drive disk 1452*a* and a second support frame 1452*b*. The second support frame 1452*b* is inserted into the second planet gears 1451 and rotatably connected to the second planet gears 1451 so that the second planet gears 1451 can drive the second drive disk 1452*a* to rotate about the first axis 101. In this example, as shown in FIG. 11, the second drive disk 1452*a* is formed at the rear end of the main shaft 151. The second planet gears 1451 drive, through the second planet carrier 1452, the main shaft 151 to rotate. In other alternative examples, the second drive disk 1452*a* and the main shaft 151 may be independent components, and the second drive disk 1452*a* is connected to the main shaft 151 as long as the second planet gears 1451 can drive the main shaft 151 to rotate.

As shown in FIGS. 6 to 8, the second-stage planetary gearset 145 has two transmission ratios. The second transmission ratio is basically equal to 1, that is to say, the second-stage planetary gearset 145 implements only the transmission function. The second-stage planetary gearset 145 is in a second drive state. A third transmission ratio is greater than 1, that is to say, reduction transmission is performed. The second-stage planetary gearset 145 is in a second variable state.

In the second variable state, the second inner ring gear 1453 is fixed. In this example, the second inner ring gear 1453 cannot rotate about the first axis 101, and the second-stage planetary gearset 145 implements a speed change function. When the second-stage planetary gearset 145 is in the second drive state, the second inner ring gear 1453 is released and allowed to be driven to rotate by the second sun gear 1444. The second inner ring gear 1453 and the first planet carrier 1442 rotate synchronously about the first axis 101, and the second-stage planetary gearset 145 has no reduction effect. In this example, meshing teeth are formed on the outer circumferential side of the first drive disk 1442*a*. When the second-stage planetary gearset 145 is in the second drive state, the second inner ring gear 1453 meshes and rotates synchronously with the meshing teeth of the first drive disk 1442*a*.

The fixation and release of the inner ring gear and the structure and process for adjusting the transmission ratio in the transmission mechanism 14 are described in detail below.

As shown in FIGS. 3 to 9 and 12, the housing assembly 14*a* includes a first housing 141, a first cover 142 mounted at an end of the first housing 141, and a locking ring 143 at the other end of the first housing 141. The first housing 141 extends along the first axis 101 and forms a cylindrical accommodation space. The first-stage planetary gearset 144 and the second-stage planetary gearset 145 are at least partially accommodated in the first housing 141. The first cover 142 extends along a direction perpendicular to the first axis 101 and is mounted at an end of the first housing 141 facing the electric motor 12. A second bearing 123 for supporting the motor shaft 121 is disposed on the motor shaft 121. In this example, the second bearing 123 is a front bearing of the electric motor. The first cover 142 is provided with an accommodation portion 1422, and the second bearing 123 is accommodated in the accommodation portion 1422. The motor shaft 121 extends out of the first cover 142 into the first housing 141 through the accommodation portion 1422 so that the first sun gear 122 disposed at the front end of the motor shaft 121 extends into the first housing 141.

Figure 12:
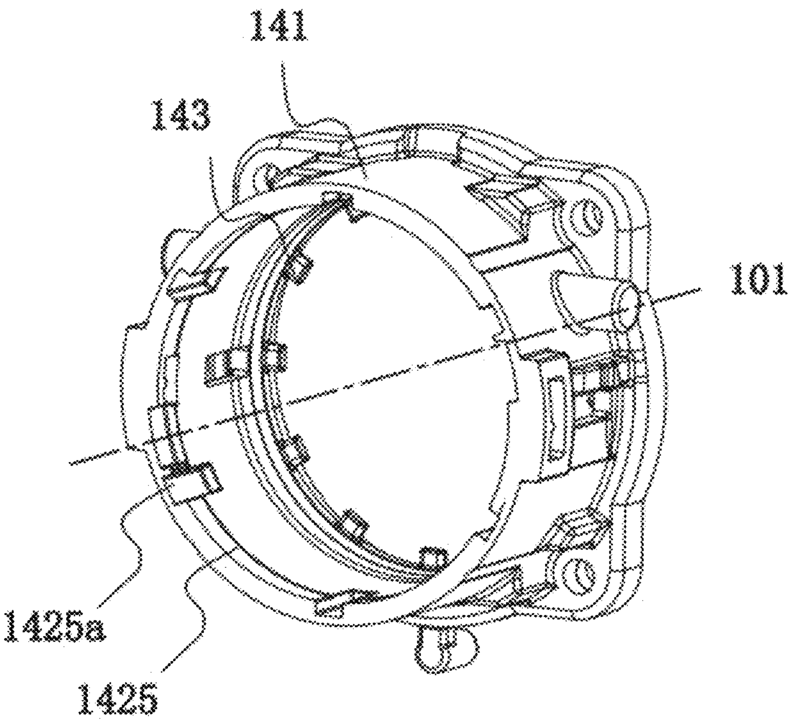
FIG. 12 is a view showing the assembly of a first housing and a locking ring.

As shown in FIG. 12, the first housing 141 or the first cover 142 is formed with or connected to a locking portion 1425 for preventing the rotation of the first inner ring gear 1443. The locking portion 1425 includes multiple first locking teeth 1425*a* circumferentially spaced around the first axis 101. The first locking teeth 1425*a* extend along an axial direction of the first housing 141, that is, extend along the direction of the first axis 101. As shown in FIG. 4, the first inner ring gear 1443 includes multiple first mating teeth 1443*a* circumferentially spaced on the first inner ring gear 1443. The first mating teeth 1443*a* extend along an axial direction of the first inner ring gear 1443, that is, extend along the direction of the first axis 101. The first locking teeth 1425*a* and the first mating teeth 1443*a* are staggered in the circumferential direction of the first axis 101. When the first mating teeth 1443*a* are connected to the first locking teeth 1425*a*, the first locking teeth 1425*a* prevent the rotation of the first mating teeth 1443*a* relative to the first locking teeth 1425*a*. When the first locking teeth 1425*a* and the first mating teeth 1443*a* are engaged and in contact with each other, the first inner ring gear 1443 is fixed.

In this example, since the first-stage planetary gearset outputs only one transmission ratio, the first inner ring gear cannot move. In other alternative examples, the first inner ring gear may translate forward and backward along the direction of the first axis. In this case, the first housing is provided with a flange portion extending into the first housing, and the flange portion is formed with or fixed to a locking portion for preventing the rotation of the first inner ring gear. The locking portion is the same as that described above. When the first inner ring gear is driven to move forward, the first inner ring gear is released from the locking portion. The first inner ring gear meshes and rotates synchronously with the meshing teeth of the first drive disk. At this time, the first-stage planetary gearset is in a drive state and has no reduction effect.

The second inner ring gear 1453 is locked and released as follows. The locking ring 143 is formed at or connected to an end of the first housing 141 facing the output shaft 131. The locking ring 143 is used for locking the second inner ring gear 1453. The locking ring 143 includes multiple second locking teeth 1431 circumferentially spaced around the first axis 101. The second locking teeth 1431 extend along the axial direction of the first housing 141, that is, extend along the direction of the first axis 101. The second inner ring gear 1453 is provided with second mating teeth 1453*a*. The second mating teeth 1453*a* extend along an axial direction of the second inner ring gear 1453, that is, extend along the direction of the first axis 101. The second locking teeth 1431 and the second mating teeth 1453*a* are staggered in the circumferential direction of the first axis 101. When the second mating teeth 1453*a* are connected to the second locking teeth 1431, the second locking teeth 1431 prevent the rotation of the second mating teeth 1453*a* relative to the second locking teeth 1431. When the second locking teeth 1431 and the second mating teeth 1453*a* are engaged and in contact with each other, the second inner ring gear 1453 is fixed. When the second inner ring gear 1453 is driven to move backward, the second inner ring gear 1453 is released from the locking portion 1425. The second inner ring gear 1453 meshes and rotates synchronously with the meshing teeth of the first drive disk 1442*a*. At this time, the second-stage planetary gearset is in the drive state and has no reduction effect. To facilitate the manufacturing of a mold of the first housing 141, the locking ring 143 is fixed into the first housing 141 in the form of an embedded component.

As shown in FIG. 1, the impact wrench 100 further includes a switching mechanism 16 for driving the transmission mechanism to switch between different transmission states. The switching mechanism 16 includes an operating member 163 for the user to operate. As shown in FIGS. 6 to 9, the switching mechanism 16 includes a shift fork. The operating member 163 drives the shift fork to displace. In this example, the shift fork includes a first shift fork 161 for driving the second inner ring gear 1453, and the first shift fork 161 is connected to the second inner ring gear 1453. When the second-stage planetary gearset 145 is required to be in the second variable state, the first shift fork 161 is operated to drive the second inner ring gear 1453 to move along the first axis 101 towards the impact mechanism 15 until the second inner ring gear 1453 is locked and connected to the locking ring 143, and the rotation of the second inner ring gear 1453 about the first axis 101 is prevented. At this time, the second inner ring gear 1453 is at the first position. When the second-stage planetary gearset 145 is required to be in the second drive state, the first shift fork 161 is operated to drive the second inner ring gear 1453 to move along the first axis 101 towards the first planet carrier 1442 until the second inner ring gear 1453 is unlocked and disconnected from the locking ring 143. At this time, the second inner ring gear 1453 is at the second position. The second inner ring gear 1453 meshes and rotates synchronously with the meshing teeth of the first planet carrier 1442. It is equivalent to the rotation of the second inner ring gear 1453 in synchronization with the second sun gear 1444.

In other alternative examples, when the transmission state of the first-stage planetary gearset is adjustable, the shift fork further includes a second shift fork for driving the first inner ring gear, and the second shift fork is connected to the first inner ring gear. When the first-stage planetary gearset is required to be in a variable state, the second shift fork is operated to drive the first inner ring gear to move along the first axis towards the first cover until the first locking teeth are engaged and in contact with the first mating teeth, and the rotation of the first inner ring gear about the first axis is prevented. When the first-stage planetary gearset is required to be in a drive state, the second shift fork is operated to drive the first inner ring gear to move along the first axis away from the first cover until the first locking teeth are disengaged from the first mating teeth. At this time, the first inner ring gear is at the second position.

The impact mechanism 15 further includes a first bearing 1512 for supporting the main shaft 151. In this example, the first bearing 1512 is a ball bearing or a needle roller bearing. Along the direction of the first axis 101, the first bearing 1512 is closer to the output shaft 131 than the multi-stage planetary transmission assembly. It is to be understood that the first bearing 1512 is sleeved on the periphery of the main shaft 151 and located in front of the planet gears. In this example, the first bearing 1512 is located in front of the second planet gears 1451. Along the direction of the first axis 101, the locking ring 143 is provided with the second locking teeth 1431 on one side and formed with an open annular groove 1432 on the other side. The annular groove 1432 opens towards the impact mechanism 15. The outer side of the first bearing 1512 at least partially abuts against a sidewall of the annular groove 1432. Thus, a radial displacement of the first bearing 1512 along the first axis 101 is prevented. The rear end face of the first bearing 1512 abuts against a bottom wall of the annular groove 1432. The main shaft 151 extends along the direction perpendicular to the first axis 101 to form a stop surface, where the diameter of the stop surface is greater than the inner diameter of the first bearing 1512. The front end face of the first bearing 1512 abuts against the stop surface. Thus, an axial displacement of the first bearing 1512 along the direction of the first axis 101 is prevented. The stability of rotational support for the main shaft 151 is ensured, and the mechanisms of the present application are more compact.

In some examples, both the first inner ring gear and the second inner ring gear are prevented from rotating, and the switching mechanism is removed or fixed. Thus, the multi-stage planetary transmission assembly includes both reduction drives. Multi-stage reduction is added so that the ratio of the output rotational speed of the electric motor to the output rotational speed of the output shaft becomes larger. In this manner, when the output rotational speed of the output shaft is low, the electric motor is not prone to the startup failure. Moreover, impact can be implemented when the output rotational speed of the output shaft is low. In the other aspect, the multi-stage reduction is performed for torque increase so that the electric motors with low power can be applied to the impact tool.

Figure 10:
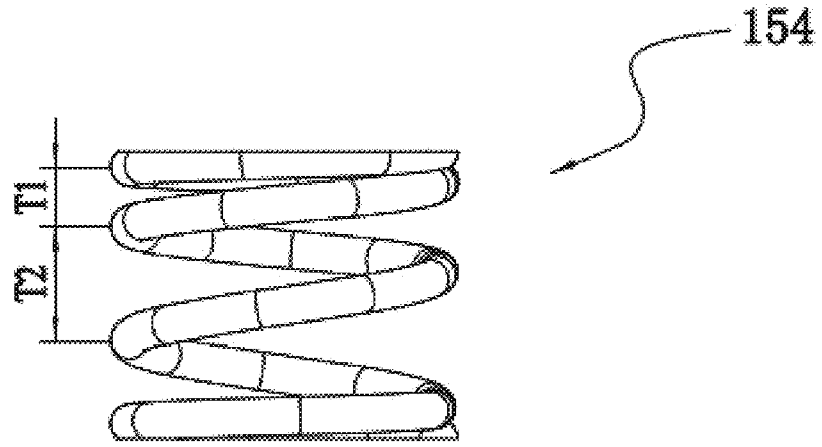
FIG. 10 is a structural view of an elastic element.

To further expand the working conditions where the impact wrench is used, in this example, the elastic element has at least two different spring constants. For example, the elastic element includes a first spring constant K1 and a second spring constant K2. The first spring constant K1 is smaller than the second spring constant K2. When a small impact force or rapid impact is required, the first spring constant K1 is used. When a high impact force is required, both the first spring constant K1 and the second spring constant K2 are activated. As shown in FIG. 10, in order that the elastic element has at least two different spring constants, the elastic element is configured to be a coil spring with pitches T1 and T2, where T1 is smaller than T2. In other alternative examples, the elastic element may be a conical spring. In other alternative examples, the elastic element is configured to include two single spring elements with different spring constants, where the two single spring elements are connected to each other in parallel or in series.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

an electric motor comprising a motor shaft rotating about a first axis;

an output shaft used for outputting power and rotating about an output axis;

an impact mechanism for applying an impact force to the output shaft; and a transmission mechanism, for transmitting power between the motor shaft and the impact mechanism, wherein the transmission mechanism comprises a multi-stage transmission assembly, at least one stage of transmission assembly in the multi-stage transmission assembly has an adjustable transmission ratio, and an output transmission ratio of the multi-stage transmission assembly is greater than 1, and wherein when the impact tool is performing an impact function, the transmission mechanism is operable to be adjusted between at least two transmission states so that the output shaft outputs different rotational speeds.

2. The impact tool according to claim 1, wherein the output transmission ratio of the transmission mechanism in any of the at least two transmission states is greater than 1.

3. The impact tool according to claim 1, further comprising a switching mechanism for driving the transmission mechanism to switch between the at least two transmission states.

4. The impact tool according to claim 1, wherein the impact mechanism comprises a main shaft driven by the motor shaft and a first bearing for supporting the main shaft.

5. The impact tool according to claim 4, wherein the transmission mechanism comprises a first-stage planetary gearset and a second-stage planetary gearset, the first-stage planetary gearset is positioned nearer to the motor shaft relative to the second-stage planetary gearset, and the second-stage planetary gearset is positioned nearer to the impact mechanism relative to the first-stage planetary gearset.

6. The impact tool according to claim 5, wherein the second-stage planetary gearset has two transmission ratios, and at least one of the two transmission ratios of the second-stage planetary gearset is greater than 1.

7. The impact tool according to claim 5, wherein the second-stage planetary gearset comprises an inner ring gear configured to move between a first position and a second position.

8. The impact tool according to claim 7, wherein, when the inner ring gear is at the first position, the inner ring gear is prevented from rotating.

9. The impact tool according to claim 7, wherein the transmission mechanism further comprises a locking ring for limiting the inner ring gear, and the locking ring is connected to the first bearing for supporting the main shaft.

10. The impact tool according to claim 4, wherein, along a direction of the first axis, the first bearing is closer to the output shaft relative to the multi-stage transmission assembly.

11. The impact tool according to claim 10, wherein the impact mechanism comprises an impact block driven by the main shaft and a hammer anvil that mates with the impact block and is struck by the impact block, the hammer anvil drives the output shaft to rotate, and the impact block rotates integrally with the main shaft through balls and is capable of reciprocating a specified stroke relative to the main shaft along the direction of the first axis to periodically mate with the hammer anvil.

12. The impact tool according to claim 11, wherein the impact mechanism further comprises an elastic element that provides a force for the impact block to approach the hammer anvil, and the elastic element has at least two different spring constants.

13. The impact tool according to claim 12, wherein an elastic element is configured to be a coil spring with different pitches.

14. The impact tool according to claim 1, further comprising a power supply that provides a nominal voltage of at least 4 V and that supplies electrical energy to the electric motor.

15. An impact tool, comprising:

an electric motor comprising a motor shaft rotating about a first axis;

an output shaft used for outputting power and rotating about an output axis;

an impact mechanism used for applying an impact force to the output shaft and comprising a main shaft driven by the motor shaft; and a transmission mechanism for transmitting power between the motor shaft and the main shaft, wherein when the impact tool is performing an impact function, an output transmission ratio of the transmission mechanism is adjustable to enable the output shaft to output different rotational speeds.

16. An impact tool, comprising:

an electric motor comprising a motor shaft rotating about a first axis;

an output shaft used for outputting power and rotating about an output axis;

an impact mechanism used for applying an impact force to the output shaft and comprising a main shaft driven by the motor shaft;

a first bearing for supporting the main shaft; and a transmission mechanism for transmitting power between the motor shaft and the main shaft, wherein the transmission mechanism comprises a multi-stage transmission assembly and, along a direction of the first axis, the first bearing is closer to the output shaft relative to the multi-stage transmission assembly, and wherein when the impact tool is performing impact function, the transmission mechanism is operable to be adjusted between at least two transmission states so that the output shaft outputs different rotational speeds.

17. The impact tool according to claim 16, wherein an output transmission ratio of the transmission mechanism is adjustable.

18. The impact tool according to claim 17, wherein the output transmission ratio of the multi-stage transmission assembly is greater than 1.

19. The impact tool according to claim 17, further comprising a power supply that provides a nominal voltage of at least 4 V and that supplies electrical energy to the electric motor.

* * * * *